(12) United States Patent
Kodama et al.

(10) Patent No.: US 12,134,129 B2
(45) Date of Patent: Nov. 5, 2024

(54) SURFACE TREATMENT METHOD AND DEVICE FOR HYDROGEN ABSORBING ALLOY POWDER

(71) Applicant: TOYOTA JIDOSHA KABUSHIKI KAISHA, Toyota (JP)

(72) Inventors: Masashi Kodama, Hadano (JP); Motoyoshi Okumura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 199 days.

(21) Appl. No.: 17/667,068

(22) Filed: Feb. 8, 2022

(65) Prior Publication Data

US 2022/0274164 A1   Sep. 1, 2022

(30) Foreign Application Priority Data

Mar. 1, 2021   (JP) .................................. 2021-031688

(51) Int. Cl.
*B22F 1/145* (2022.01)
*H01M 10/30* (2006.01)

(52) U.S. Cl.
CPC .......... *B22F 1/145* (2022.01); *B22F 2202/15* (2013.01); *B22F 2202/17* (2013.01); *B22F 2301/155* (2013.01); *B22F 2998/10* (2013.01); *H01M 10/30* (2013.01)

(58) Field of Classification Search
CPC .. B22F 1/145; B22F 2202/15; B22F 2022/17; B22F 2301/155; B22F 2998/10; H01M 10/30

See application file for complete search history.

(56) References Cited

U.S. PATENT DOCUMENTS

| 6,454,830 | B1 | 9/2002 | Ito et al. | |
| 2001/0054458 | A1* | 12/2001 | Kikuyama | ............ C01B 3/0078 |
| | | | | 429/218.2 |
| 2002/0122982 | A1* | 9/2002 | Okada | .................. C22C 1/0441 |
| | | | | 429/218.2 |

FOREIGN PATENT DOCUMENTS

| JP | 2001-062332 A | 3/2001 |
| JP | 2005-310605 A | 11/2005 |
| JP | 2020-100892 A | 7/2020 |

* cited by examiner

*Primary Examiner* — Nathan H Empie
(74) *Attorney, Agent, or Firm* — Sughrue Mion, PLLC

(57) ABSTRACT

A surface treatment method for a hydrogen absorbing alloy powder of the present disclosure is used for a surface treatment on a hydrogen absorbing alloy powder containing rare earth elements and nickel as constituent elements, including an immersion process in which the hydrogen absorbing alloy powder is immersed in an aqueous alkaline solution; and a removal process in which a liquid containing the hydrogen absorbing alloy powder immersed in the aqueous alkaline solution is introduced into a liquid cyclone, and undesired substances having a smaller specific gravity than the hydrogen absorbing alloy powder adhered to the surface of the hydrogen absorbing alloy powder are removed.

2 Claims, 2 Drawing Sheets

|  | PROCESS PROCESSING CAPACITY | BATTERY CAPACITY | OUTPUT AT LOW TEMPERATURE (W) |
|---|---|---|---|
| COMPARATIVE EXAMPLE | 100 | 100 | 100 |
| EXAMPLE 1 | 250 | 103 | 105 |
| EXAMPLE 2 | 400 | 101 | 102 |

SURFACE TREATMENT METHOD AND DEVICE FOR HYDROGEN ABSORBING ALLOY POWDER

CROSS-REFERENCE TO RELATED APPLICATION

This application claims priority to Japanese Patent Application No. 2021-031688 filed on Mar. 1, 2021, incorporated herein by reference in its entirety.

BACKGROUND

1. Technical Field

The present disclosure relates to a surface treatment method and a device for a hydrogen absorbing alloy powder containing rare earth elements and nickel as constituent elements.

2. Description of Related Art

In the related art, as a method of producing a hydrogen absorbing alloy electrode (negative electrode) of a nickel hydride secondary battery, a method in which an electrode is formed from a powder obtained through a first process (alkaline treatment) in which a hydrogen absorbing alloy powder containing rare earth elements, nickel and cobalt as constituent elements and having an average particle size of 20 μm to 35 μm is immersed in an aqueous alkaline solution and a treatment bath containing the powder is stirred, a second process in which hydroxides of elements including rare earth elements as main components generated on a surface of the hydrogen absorbing alloy powder in the first process are separated from the surface, a third process in which the hydrogen absorbing alloy powder is washed, and a fourth process in which hydrogen is desorbed is known (for example, refer to Japanese Unexamined Patent Application Publication No. 2005-310605 (JP 2005-310605 A). According to such a method, a continuous surface layer containing Ni and Co without cavities can be formed on a hydrogen absorbing alloy powder according to an alkaline treatment, and the hydrogen absorbing alloy powder can be activated. In addition, in the second process of the method, after ultrasonic waves are applied to a dispersion of the hydrogen absorbing alloy powder that has been pressed and filtered for a predetermined time, wastewater is caused to flow while pure water is injected from a lower part of a stirring tank, and thus the hydroxide released from the alloy is removed. In addition, in the third process, the alloy is repeatedly washed and pressed and filtered using a hydrochloric acid aqueous solution until the pH becomes 10 or less, and the alloy washed with pure water is then pressed and filtered.

SUMMARY

However, in the method in the related art, much time is required for the second and third processes for separating and removing hydroxides, which are undesired substances generated by the alkaline treatment, from the surface of the hydrogen absorbing alloy powder, and there are problems in terms of productivity and cost. On the other hand, in the method in the related art, when priority is given to shortening the time for the undesired substance removal process, the hydrogen storage and release performance of the hydrogen absorbing alloy powder is impaired due to the residual electrically insulating hydroxides and the like on the surface layer containing nickel and the like. Therefore, in the production fields of products using hydrogen absorbing alloys, a method in which undesired substances are removed from the surface of an alkali-treated hydrogen absorbing alloy powder quickly, and the hydrogen absorbing alloy powder can be favorably activated is required.

Therefore, a main object of the present disclosure is to provide a surface treatment method and a device for a hydrogen absorbing alloy powder through which undesired substances can be sufficiently and quickly removed from a surface layer of a hydrogen absorbing alloy powder and the hydrogen absorbing alloy powder can be favorably activated.

A surface treatment method for a hydrogen absorbing alloy powder of the present disclosure is a surface treatment method for a hydrogen absorbing alloy powder containing rare earth elements and nickel as constituent elements, including an immersion process in which the hydrogen absorbing alloy powder is immersed in an aqueous alkaline solution; and a removal process in which a liquid containing the hydrogen absorbing alloy powder immersed in the aqueous alkaline solution is introduced into a liquid cyclone, and undesired substances having a smaller specific gravity than the hydrogen absorbing alloy powder adhered to the surface of the hydrogen absorbing alloy powder are removed.

The inventors have conducted extensive studies to remove undesired substances such as hydroxides generated according to immersion in the aqueous alkaline solution from the surface of the hydrogen absorbing alloy powder quickly. As a result, the inventors have found that, by introducing (press-fitting) a liquid containing the hydrogen absorbing alloy powder immersed in the aqueous alkaline solution into the liquid cyclone, undesired substances having a smaller specific gravity than the hydrogen absorbing alloy powder can be removed sufficiently and quickly from the surface of the hydrogen absorbing alloy powder. That is, the hydrogen absorbing alloy powder introduced into the liquid cyclone is moved toward the inner peripheral surface of the liquid cyclone through the action of a centrifugal force, and accordingly, undesired substances having a smaller specific gravity than the hydrogen absorbing alloy powder such as hydroxides are separated from the surface of the powder. In addition, the hydrogen absorbing alloy powder having a large specific gravity descends to the lower part of the liquid cyclone, and undesired substances having a small specific gravity rise in the liquid cyclone. Thereby, according to the surface treatment method for a hydrogen absorbing alloy powder of the present disclosure, it is possible to remove undesired substances such as hydroxides sufficiently and quickly from the surface layer of the hydrogen absorbing alloy powder and the hydrogen absorbing alloy powder can be favorably activated.

In addition, the liquid cyclone may include a liquid inlet, a lower outlet through which particles having a larger specific gravity are discharged, and an upper outlet through which particles having a smaller specific gravity are discharged, and in the removal process, water may be applied to the hydrogen absorbing alloy powder discharged from the lower outlet of the liquid cyclone and introduced again to the liquid inlet.

Therefore, the time required for removing undesired substances such as hydroxides from the surface layer of the hydrogen absorbing alloy powder is shortened, the treatment of separating the hydrogen absorbing alloy powder and undesired substances in the liquid cyclone is repeatedly performed, and the hydrogen absorbing alloy powder can be very favorably activated.

In addition, the surface treatment method for a hydrogen absorbing alloy powder of the present disclosure may further include a hydrogen desorption process in which the hydrogen absorbing alloy powder is brought into contact with an oxidant and hydrogen is desorbed, after the immersion process, and the removal process may be performed after the hydrogen desorption process.

Therefore, the time required for the surface treatment of the hydrogen absorbing alloy powder can be shortened and the hydrogen absorbing alloy powder can be favorably activated.

A surface treatment device for a hydrogen absorbing alloy powder of the present disclosure is a surface treatment device for a hydrogen absorbing alloy powder containing rare earth elements and nickel as constituent elements, including a treatment tank; a pump that sucks and discharges a liquid from the treatment tank; and a liquid cyclone including a liquid inlet that is connected to a discharge port of the pump, a lower outlet through which particles having a larger specific gravity are discharged, and an upper outlet through which particles having a smaller specific gravity are discharged.

When the surface treatment is performed on the hydrogen absorbing alloy powder using such a surface treatment device, after at least the hydrogen absorbing alloy powder is immersed in the aqueous alkaline solution in the treatment tank, the pump is operated so that the liquid is sucked from the treatment tank and discharged (pressure-fed) to the liquid inlet of the liquid cyclone. The hydrogen absorbing alloy powder introduced (press-fitted) into the liquid cyclone by the pump moves toward the inner peripheral surface of the liquid cyclone through the action of a centrifugal force, and accordingly, undesired substances such as hydroxides having a smaller specific gravity than the hydrogen absorbing alloy powder are separated from the surface of the powder. In addition, the hydrogen absorbing alloy powder having a larger specific gravity descends to the lower part of the liquid cyclone and is discharged from the lower outlet, and undesired substances having a smaller specific gravity rise in the liquid cyclone and are discharged (overflow) from the upper outlet. Therefore, it is possible to remove undesired substances such as hydroxides sufficiently and quickly from the surface layer of the hydrogen absorbing alloy powder and the hydrogen absorbing alloy powder can be favorably activated. Here, in the treatment tank, in order to desorb hydrogen, the hydrogen absorbing alloy powder immersed in the aqueous alkaline solution may be additionally brought into contact with an oxidant.

In addition, the surface treatment device may further include an introduction pipe that connects the discharge port of the pump and the liquid inlet; a return pipe that connects the lower outlet of the liquid cyclone and the treatment tank; a supply pipe through which water is supplied into the treatment tank; and a powder recovery pipe that is connected to the introduction pipe via an on-off valve.

In such a surface treatment device, the hydrogen absorbing alloy discharged from the lower outlet of the liquid cyclone can be returned to the treatment tank via the return pipe, and can be introduced again into the liquid inlet via the introduction pipe together with water that is separately supplied into the treatment device via the supply pipe. Thereby, the treatment of separating the hydrogen absorbing alloy powder and undesired substances in the liquid cyclone is repeatedly performed, and the hydrogen absorbing alloy powder in which undesired substances are sufficiently removed from the surface layer can be accumulated in the treatment tank. As a result, the time required for removing undesired substances such as hydroxides from the surface layer of the hydrogen absorbing alloy powder is shortened, undesired substances are sufficiently removed from the surface layer of the hydrogen absorbing alloy powder, and the hydrogen storage and release performance of the hydrogen absorbing alloy powder can be further improved. In addition, by opening the on-off valve and operating the pump, the hydrogen absorbing alloy powder in the treatment tank can be recovered via the powder recovery pipe.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next, a mode for performing the disclosure of the present disclosure will be described with reference to the drawings.

Figure 1:
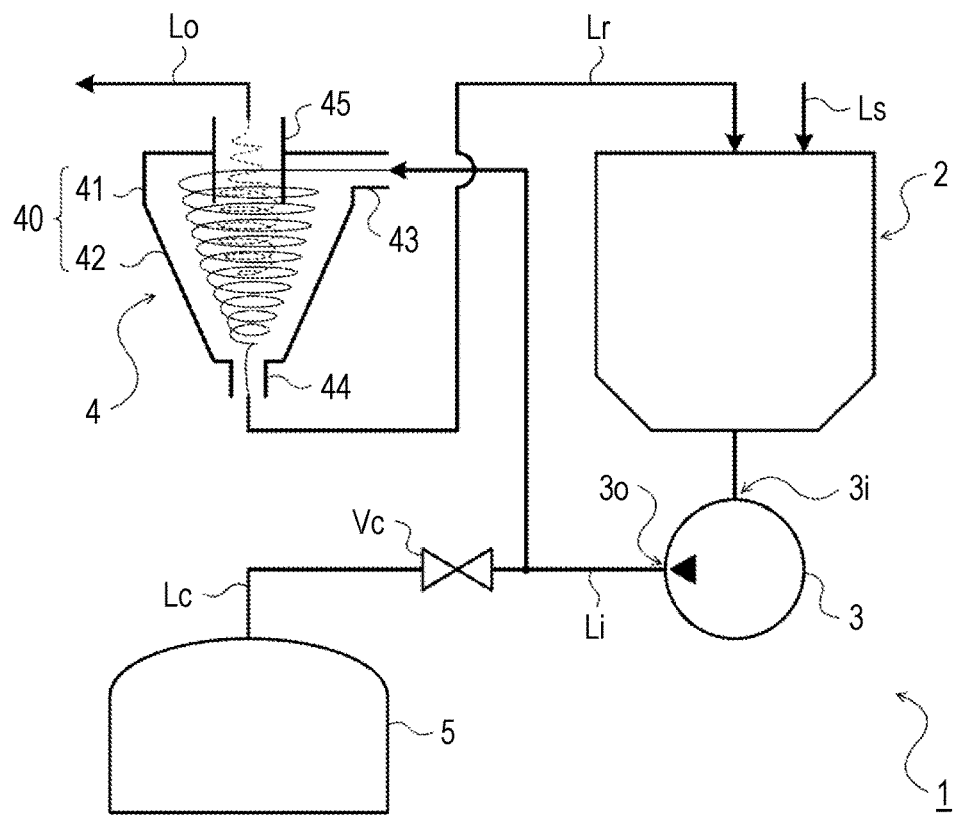
FIG. 1 is a schematic configuration diagram showing a surface treatment device for a hydrogen absorbing alloy powder of the present disclosure.

FIG. 1 is a schematic configuration diagram showing a surface treatment device (hereinafter simply referred to as a "surface treatment device") 1 for a hydrogen absorbing alloy powder of the present disclosure. When an electrode (negative electrode) of a nickel hydride secondary battery composed of a hydrogen absorbing alloy containing rare earth elements and nickel as constituent elements is produced, the surface treatment device 1 shown in FIG. 1 is used to perform a surface treatment on the hydrogen absorbing alloy. As shown in FIG. 1, the surface treatment device 1 includes a treatment tank 2, a pump 3, a liquid cyclone 4 and a storage tank 5.

The treatment tank 2 of the surface treatment device 1 is used for an alkaline treatment for a hydrogen absorbing alloy or desorption of hydrogen and has a stirring mechanism (not shown). In addition, a supply pipe Ls is connected to an upper part of the treatment tank 2, and an aqueous alkaline solution, water (pure water) or the like can be supplied into the treatment tank 2 via the supply pipe Ls. The pump 3 is an electric pump, and has a suction port 3$i$ and a discharge port 3$o$ connected to a lower part of the treatment tank 2 via a pipe. The pump 3 sucks a liquid in the treatment tank 2 via the suction port 3$i$ and discharges it from the discharge port 3$o$.

The liquid cyclone 4 separates particles using a centrifugal force generated by a liquid swirling flow, and has a main body 40 into which a liquid containing the hydrogen absorbing alloy is introduced. As shown in FIG. 1, the main body 40 of the liquid cyclone 4 has a cylindrical part 41 having a closed upper end and a conical part 42 whose diameter decreases downward from the lower end of the cylindrical part 41. On the side surface of the cylindrical part 41 of the main body 40, a liquid inlet 43 through which a liquid is introduced into the cylindrical part 41 in the tangential direction is formed, and the liquid inlet 43 is connected to the discharge port 3o of the pump 3 via an introduction pipe Li. In addition, in the lower part of the conical part 42 of the main body 40, a lower outlet 44 through which particles having a larger specific gravity contained in the liquid introduced into the main body 40 are discharged is formed. One end of a return pipe Lr is connected to the lower outlet 44, and the other end of the return pipe Lr is connected to the upper part of the treatment tank 2.

In addition, inside a part of the cylindrical part 41 and the conical part 42 of the main body 40, a cylindrical component 45 that defines a circular path together with an inner peripheral surface of the cylindrical part 41 or the like is disposed. The upper end of the cylindrical component 45 protrudes upward (outward) from a closed end of the cylindrical part 41 and is connected to a waste liquid tank (not shown) via a discharge pipe Lo. Therefore, the upper end of the cylindrical component 45 functions as an upper outlet of the liquid cyclone 4 that allows particles having a smaller specific gravity contained in the liquid introduced into the main body 40 to be discharged.

In addition, one end of a powder recovery pipe Lc including an on-off valve Vc is connected to the middle of the introduction pipe Li connecting the discharge port 3o of the pump 3 and the liquid inlet 43 of the liquid cyclone 4. The other end of the powder recovery pipe Lc is connected to the upper part of the storage tank 5, and the discharge port 3o of the pump 3 and the storage tank 5 communicate with each other when the on-off valve Vc is opened. However, instead of the on-off valve Vc, a three-way valve may be incorporated into the introduction pipe Li, and another on-off valve (not shown) may be incorporated into the introduction pipe Li so that it is positioned between the on-off valve Vc and the liquid inlet 43.

Figure 2:
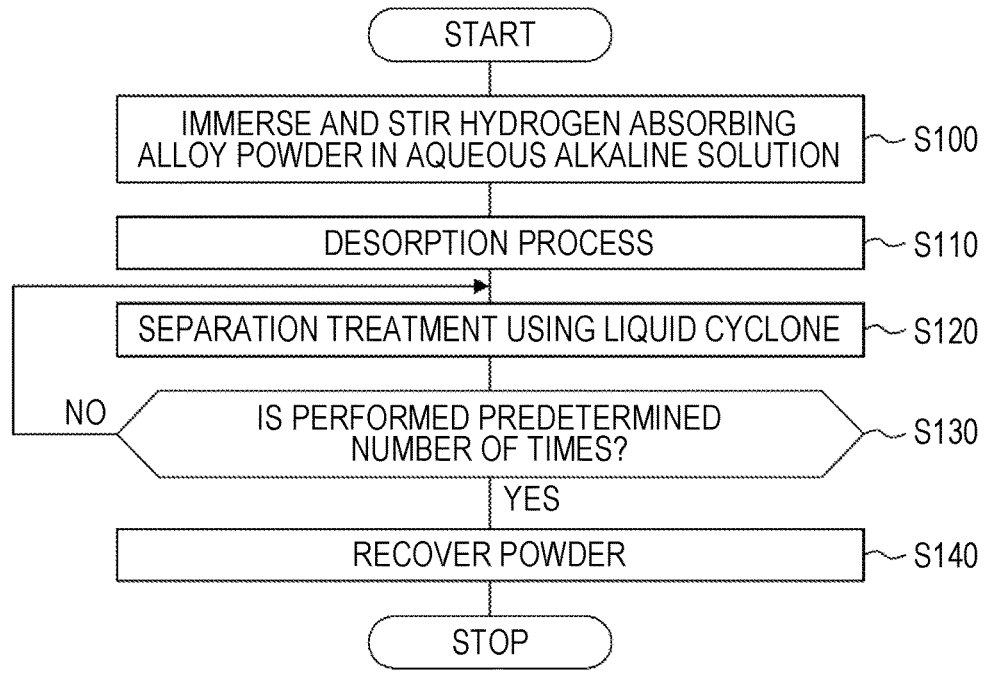
FIG. 2 is a flowchart for illustrating a surface treatment method for a hydrogen absorbing alloy powder of the present disclosure.

Subsequently, a surface treatment method for a hydrogen absorbing alloy powder of the present disclosure using the surface treatment device 1 will be described with reference to FIG. 1 and FIG. 2.

In the surface treatment of the hydrogen absorbing alloy powder, a predetermined amount of an aqueous alkaline solution having a predetermined concentration such as an aqueous potassium hydroxide solution, an aqueous sodium hydroxide solution or an aqueous lithium hydroxide solution is stored in the treatment tank 2, and a predetermined amount of a hydrogen absorbing alloy powder containing rare earth elements and nickel as constituent elements having a predetermined average particle size (for example, 10 μm to 35 μm) is added to the aqueous alkaline solution (Step S100). In Step S100, the hydrogen absorbing alloy powder is immersed in the aqueous alkaline solution for a predetermined time while keeping the liquid in the treatment tank 2 at a predetermined temperature and stirring it with a stirring mechanism. In addition, after the hydrogen absorbing alloy powder is immersed in the aqueous alkaline solution for a predetermined time, a predetermined amount of the hydrogen peroxide solution having a predetermined concentration is introduced as an oxidant into the treatment tank 2, and hydrogen in the hydrogen absorbing alloy powder is desorbed (Step S110)

According to treatments of Steps S100 (immersion process) and S110 (hydrogen desorption process), a surface layer containing Ni is formed on a hydrogen absorbing alloy powder and hydrogen in the hydrogen absorbing alloy powder is desorbed. However, rare earth elements, manganese, aluminum and the like are eluted from the hydrogen absorbing alloy powder according to the alkaline treatment in Step S100 and hydroxylated, and undesired substances such as electrically insulating hydroxides such as those of rare earth elements adhere to the surface of the hydrogen absorbing alloy powder. Such undesired substances inhibit a battery reaction in a nickel hydride secondary battery including a negative electrode formed of a hydrogen absorbing alloy powder. Therefore, in order to secure favorable performance of the nickel hydride secondary battery, it is necessary to remove undesired substances such as hydroxides from the surface of the alkali-treated hydrogen absorbing alloy powder as far as possible. On the other hand, even if ultrasonic waves are applied to the dispersion of the hydrogen absorbing alloy powder and washing with pure water and pressurization filtering are repeatedly performed, it takes a very long time to sufficiently remove undesired substances from the surface of the hydrogen absorbing alloy powder.

Therefore, the inventors have conducted extensive studies to remove undesired substances such as hydroxides generated according to immersion in the aqueous alkaline solution from the surface of the hydrogen absorbing alloy powder sufficiently and quickly, and in the course of the studies, came up with the idea of using a liquid cyclone used for classifying particles and the like. Further, the inventors have found by experiments, analysis and the like that, by introducing (press-fitting) a liquid containing the hydrogen absorbing alloy powder immersed in the aqueous alkaline solution into the liquid cyclone, undesired substances such as hydroxides can be removed from the surface of the hydrogen absorbing alloy powder sufficiently and quickly. Based on this, in the surface treatment method for a hydrogen absorbing alloy powder of the present disclosure, after the treatments in Steps S100 and S110, in Step S120, an undesired substance separation treatment (removal process) using the liquid cyclone 4 as described above is performed.

That is, when the treatment of Step S110 is completed, the pump 3 is operated with the on-off valve Vc that is closed until the liquid in the treatment tank 2 runs out. The pump 3 sucks a liquid containing the hydrogen absorbing alloy powder in the treatment tank 2 and discharges it from the discharge port 3o at a predetermined discharge pressure, and the liquid is supplied (pressure-fed) to the liquid inlet 43 of the liquid cyclone 4 via the introduction pipe Li. The hydrogen absorbing alloy powder in the liquid introduced into the cylindrical part 41 of the liquid cyclone 4 is moved toward the inner peripheral surface of the main body 40 by the pump 3 through the action of a centrifugal force, and accordingly, undesired substances such as hydroxides having a smaller specific gravity than the hydrogen absorbing alloy powder are separated from the surface of the powder. In addition, the hydrogen absorbing alloy powder having a large specific gravity (specific gravity≅6 g/cc) descends to the lower part of the conical part 42 of the liquid cyclone 4, and is discharged into the return pipe Lr from the lower outlet 44. On the other hand, hydroxides having a small specific gravity (specific gravity≅2 g/cc) rise in the main body 40 of the liquid cyclone 4 together with the liquid, are discharged (overflow) into the discharge pipe Lo from the cylindrical component 45 as an upper outlet, and flow into the waste liquid tank.

On the other hand, the hydrogen absorbing alloy powder discharged from the lower outlet 44 of the liquid cyclone 4, which contains a small amount of liquid, is returned into the treatment tank 2 via the return pipe Lr. In addition, as the hydrogen absorbing alloy powder is returned to the treatment tank 2, a predetermined amount of water (pure water) is supplied into the treatment tank 2 via the supply pipe Ls, and the hydrogen absorbing alloy powder and water are stirred for a predetermined time in the treatment tank 2 with a stirring mechanism. After the hydrogen absorbing alloy powder and water are stirred, the pump 3 is operated again with the on-off valve Vc that is closed until the liquid in the treatment tank 2 runs out. Thereby, the hydrogen absorbing alloy powder is introduced again into the liquid cyclone 4 by the pump 3 together with water supplied into the treatment tank 2.

When the liquid is introduced again into the cylindrical part 41 of the liquid cyclone 4 by the pump 3, the hydroxides adhered to the surface of the hydrogen absorbing alloy powder are separated through the action of a centrifugal force. In addition, the hydrogen absorbing alloy powder is returned into the treatment tank 2 via the conical part 42, the lower outlet 44 and the return pipe Lr. In addition, undesired substances such as hydroxides are discharged (overflow) into the discharge pipe Lo from the cylindrical component 45 together with the liquid (water). Thereby, the treatment of separating the hydrogen absorbing alloy powder and undesired substances in the liquid cyclone 4 is repeatedly performed, and the hydrogen absorbing alloy powder in which undesired substances are sufficiently removed from the surface layer can be accumulated in the treatment tank 2.

In the present embodiment, the treatment of separating the hydrogen absorbing alloy powder and undesired substances in the liquid cyclone 4 according to an operation of the pump 3 once (predetermined time) is performed a predetermined number of times (in the present embodiment, for example, twice or more) (Step S130: NO). In addition, when the separation treatment is repeatedly performed, the pH of the liquid introduced into the liquid cyclone 4 is finally lowered to a pH of about 10. When the undesired substance separation treatment using the liquid cyclone 4 is performed a predetermined number of times, and the hydrogen absorbing alloy powder is returned from the liquid cyclone 4 into the treatment tank 2 (Step S130: YES), the hydrogen absorbing alloy powder in the treatment tank 2 is recovered in the storage tank 5 (Step S140), and a series of hydrogen absorbing alloy powder surface treatments are completed. In Step S140, the pump 3 is operated with the on-off valve Vc that is opened. Thereby, the hydrogen absorbing alloy powder in the treatment tank 2 is sucked by the pump 3, and is pressure-fed into the storage tank 5 via a part of the introduction pipe Li and the powder recovery pipe Lc.

Here, in the present embodiment, the specifications (a discharge pressure, etc.) of the pump 3 and the specifications (the volume of the main body 40, the vertical angle of the conical part 42, etc.) of the liquid cyclone 4 are determined so that the water content of the hydrogen absorbing alloy powder that has been subjected to the undesired substance separation treatment using the liquid cyclone 4 once is, for example, 4% to 10%, preferably, 6% to 8%. Thereby, it is possible to satisfactorily prevent the hydrogen absorbing alloy powder in the storage tank 5 from generating heat through reaction with oxygen or deteriorating.

Figures 3, 4:
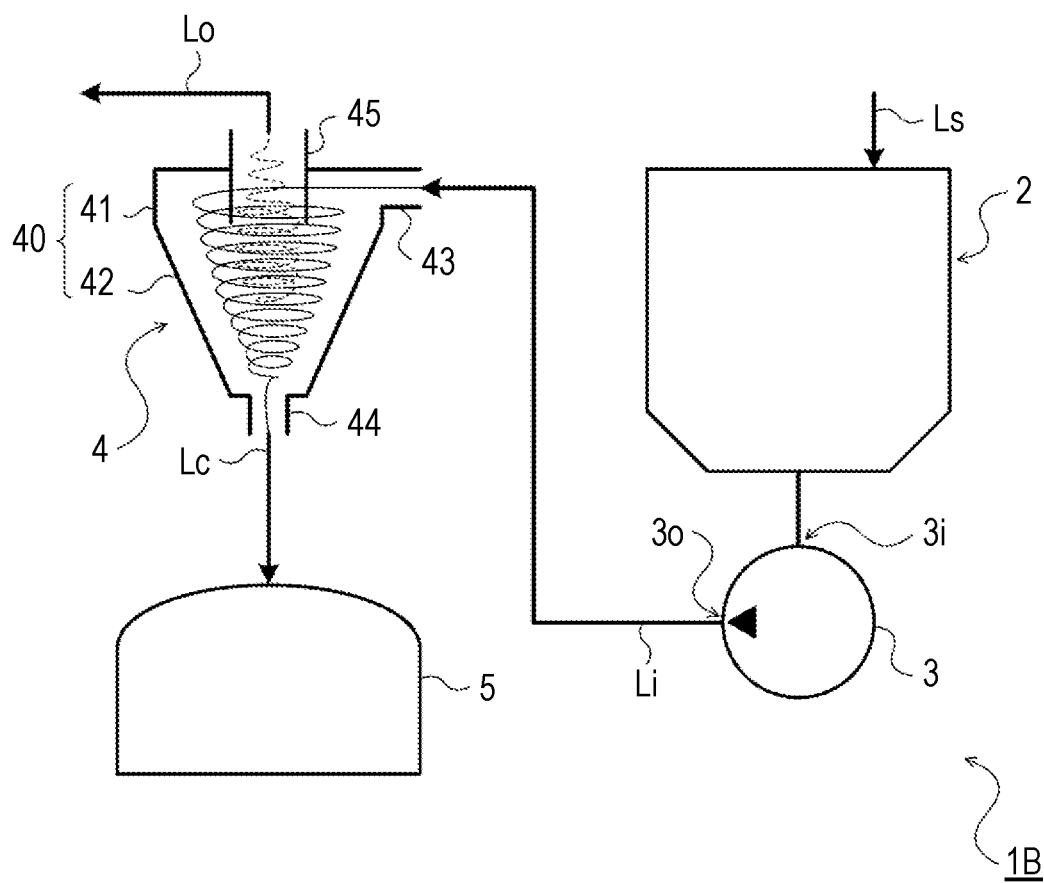
FIG. 3 is a table in which a process processing capacity, and a battery capacity and an output at a low temperature of a nickel hydride secondary battery including an electrode formed from a hydrogen absorbing alloy powder are compared according to a surface treatment method for a hydrogen absorbing alloy powder of the present disclosure and a surface treatment method of a comparative example.
FIG. 4 is a schematic configuration diagram showing another surface treatment device of the present disclosure.

FIG. 3 is a table in which a process processing capacity, and a battery capacity and an output at a low temperature of a nickel hydride secondary battery including electrode (negative electrode) formed from a hydrogen absorbing alloy powder to which the surface treatment method of the present disclosure or the comparative example is applied are compared according to the surface treatment method for the hydrogen absorbing alloy powder using the surface treatment device 1 (refer to Example 1 in FIG. 3) and the surface treatment method of the comparative example. In the surface treatment method of the comparative example, after immersion in the aqueous alkaline solution and the hydrogen desorption treatment without using the liquid cyclone 4, washing with pure water and the dehydration treatment are repeated 5 times until the pH of the liquid reaches about 10, and the solidified hydrogen absorbing alloy powder is crushed to obtain a hydrogen absorbing alloy powder from which undesired substances such as hydroxides are removed to a practically acceptable level. In addition, the process processing capacity indicates the time required for the surface treatment of the hydrogen absorbing alloy powder, and the process processing capacity in the surface treatment method of the comparative example is set to 100. In addition, the low temperature output of the nickel hydride secondary battery is an output (W) of the nickel hydride secondary battery in an environment at an ambient temperature of −30° C., and the battery capacity and the low temperature output in the surface treatment method of the comparative example are also set to 100 in the surface treatment method of the comparative example.

As shown in FIG. 3, according to the surface treatment method for a hydrogen absorbing alloy powder of the present disclosure using the surface treatment device 1, the battery capacity and the low temperature output of the nickel hydride secondary battery including an electrode (negative electrode) made of a hydrogen absorbing alloy powder treated by the surface treatment device 1 can be improved more than those of the comparative example, and the time required for the surface treatment of the hydrogen absorbing alloy powder can be shortened to about 40% of that of the comparative example. Therefore, it can be understood that, according to the surface treatment method for a hydrogen absorbing alloy powder of the present disclosure using the surface treatment device 1, undesired substances such as hydroxides can be removed sufficiently and quickly from the surface layer of the hydrogen absorbing alloy powder and the hydrogen absorbing alloy powder can be favorably activated.

In addition, in the undesired substance separation treatment (removal process) using the liquid cyclone 4 in Step S120, water is added to the hydrogen absorbing alloy powder discharged from the lower outlet 44 of the liquid cyclone 4 in the treatment tank 2, and introduced again into the liquid inlet 43. Thereby, the time required for removing undesired substances such as hydroxides from the surface layer of the hydrogen absorbing alloy powder is shortened, the treatment of separating the hydrogen absorbing alloy powder and undesired substances in the liquid cyclone 4 is repeatedly performed, and the hydrogen absorbing alloy powder can be very favorably activated.

However, the treatment of separating the hydrogen absorbing alloy powder and undesired substances in the liquid cyclone 4 according to an operation of the pump 3 once (predetermined time) may be repeatedly performed three times or more. In addition, the separation treatment need not necessarily be repeatedly performed and may be performed once. That is, in the surface treatment of the hydrogen absorbing alloy powder, a surface treatment device 1B shown in FIG. 4 may be used. The surface treatment device 1B corresponds to a device in which the return pipe Lr is omitted from the surface treatment device 1 and the lower outlet 44 of the liquid cyclone 4 is directly connected to the storage tank 5 via the powder recovery pipe Lc. When the surface treatment device 1B is used, the hydrogen absorbing alloy powder introduced into the liquid cyclone 4 according to an operation of the pump 3 once (predetermined time) flows into the storage tank 5 via the conical part 42, the lower outlet 44 and the powder recovery pipe Lc. Also in the surface treatment device 1B, the specifications (a discharge pressure, etc.) of the pump 3 and the specifications (the volume of the main body 40, the vertical angle of the conical part 42, etc.) of the liquid cyclone 4 are determined so that the water content of the hydrogen absorbing alloy powder that has been subjected to the undesired substance separation treatment using the liquid cyclone 4 once is, for example, 4% to 10%, preferably, 6% to 8%.

As shown in FIG. 3, according to the surface treatment method for a hydrogen absorbing alloy powder of the present disclosure using the surface treatment device 1B (refer to Example 2 in FIG. 3), the battery capacity and the low temperature output of the nickel hydride secondary battery including an electrode (negative electrode) formed from a hydrogen absorbing alloy powder treated by the surface treatment device 1B are improved as much as or more than those of the comparative example, and the time required for the surface treatment of the hydrogen absorbing alloy powder can be shortened to about 25% of that of the comparative example. Therefore, it can be understood that, even if the surface treatment method for a hydrogen absorbing alloy powder of the present disclosure using the surface treatment device 1B is performed, undesired substances such as hydroxides can be removed sufficiently and quickly from the surface layer of the hydrogen absorbing alloy powder and the hydrogen absorbing alloy powder can be favorably activated.

In addition, in the surface treatment devices 1 and 1B, the undesired substance separation treatment (removal process) using the liquid cyclone 4 is performed after the treatment (hydrogen desorption process) in which hydrogen in the hydrogen absorbing alloy powder is desorbed, but it is not limited thereto. That is, the undesired substance separation treatment using the liquid cyclone 4 may be performed after the treatment of immersing the hydrogen absorbing alloy powder in the aqueous alkaline solution and before the treatment of desorbing hydrogen. In addition, the liquid cyclone 4 of the surface treatment devices 1 and 1B is not limited to a so-called folding line cyclone as described above, and may be an axial-flow side cyclone.

As described above, the surface treatment method for a hydrogen absorbing alloy powder of the present disclosure is a surface treatment method for a hydrogen absorbing alloy powder containing rare earth elements and nickel as constituent elements, including an immersion process (S100) in which a hydrogen absorbing alloy powder is immersed in an aqueous alkaline solution and a foreign substance removal process (S120) in which a liquid containing the hydrogen absorbing alloy powder immersed in the aqueous alkaline solution is introduced into the liquid cyclone 4, and undesired substances having a smaller specific gravity than the hydrogen absorbing alloy powder adhered to the surface of the hydrogen absorbing alloy powder are removed. In addition, the surface treatment devices 1 and 1B for a hydrogen absorbing alloy powder of the present disclosure perform a surface treatment on the hydrogen absorbing alloy powder containing rare earth elements and nickel as constituent elements, and include the treatment tank 2, the pump 3 that sucks and discharges a liquid from the treatment tank 2, and the liquid cyclone 4 including the liquid inlet 43 that is connected to the discharge port 3o of the pump 3, the lower outlet 44 through which particles having a larger specific gravity are discharged, and the cylindrical component 45 that forms an upper outlet through which particles having a larger specific gravity are discharged. According to the surface treatment method and a device for a hydrogen absorbing alloy powder of the present disclosure, it is possible to remove undesired substances such as hydroxides sufficiently and quickly from the surface layer of the hydrogen absorbing alloy powder and the hydrogen absorbing alloy powder can be favorably activated.

Here, it is needless to say that the disclosure of the present disclosure is not limited to the embodiment, and various modifications can be made within the extend scope of the present disclosure. In addition, the embodiment is only a specific embodiment of the disclosure described in the column of the summary and does not limit elements of the disclosure described in the column of the summary.

The disclosure of the present disclosure can be used in the production fields of products using hydrogen absorbing alloys and the like.

What is claimed is:

1. A surface treatment method for a hydrogen absorbing alloy powder containing rare earth elements and nickel as constituent elements, comprising:
   immersing the hydrogen absorbing alloy powder in an aqueous alkaline solution;
   bringing the hydrogen absorbing alloy powder into contact with an oxidant such that hydrogen is desorbed from the hydrogen absorbing alloy powder while the hydrogen absorbing alloy powder is immersed in the aqueous alkaline solution; and
   introducing the liquid containing the hydrogen absorbing alloy powder into a liquid cyclone such that undesired substances having a smaller specific gravity than the hydrogen absorbing alloy powder adhered to the surface of the hydrogen absorbing alloy powder are removed in the liquid cyclone, after the hydrogen absorbing alloy powder is brought into contact with the oxidant.

2. The method according to claim 1,
   wherein the liquid cyclone includes a liquid inlet, a lower outlet through which particles having a larger specific gravity are discharged, and an upper outlet through which particles having a smaller specific gravity are discharged, and
   wherein, water is applied to the hydrogen absorbing alloy powder discharged from the lower outlet of the liquid cyclone and introduced again to the liquid inlet.

* * * * *